United States Patent [19]

Atsukawa et al.

[11] 4,038,367

[45] July 26, 1977

[54] PROCESS FOR THE REMOVAL OF $SO_x$ AND $NO_x$ FROM WASTE GASES USING ALKALI METAL OR ALKALINE EARTH METAL IODIDE

[75] Inventors: Masumi Atsukawa, Hiroshima; Naoyuki Takahashi, Saiki; Naoharu Shinoda; Naohiko Ukawa, both of Hiroshima, all of Japan

[73] Assignee: Mitsubishi Jukogyo Kabushiki Kaisha, Tokyo, Japan

[21] Appl. No.: 579,055

[22] Filed: May 20, 1975

[30] Foreign Application Priority Data

May 31, 1974  Japan .................................. 49-60904

[51] Int. Cl.$^2$ ............................................. C01B 21/00
[52] U.S. Cl. .................................. 423/235; 423/242; 423/351
[58] Field of Search ............... 423/351, 285, 239, 398, 423/399, 395, 385, 242

[56] References Cited

U.S. PATENT DOCUMENTS

| 1,918,622 | 7/1933 | van der Meulen | 423/499 |
| 2,800,390 | 7/1957 | Behrman | 423/499 |
| 2,828,184 | 3/1958 | Behrman | 423/499 |
| 3,733,393 | 5/1973 | Couillaud et al. | 423/242 |
| 3,794,714 | 2/1974 | Atsukawa et al. | 423/242 |

OTHER PUBLICATIONS

Chem. Abstr., vol. 37, No. 3999–1943.

*Primary Examiner*—O. R. Vertiz
*Assistant Examiner*—Eugene T. Wheelock
*Attorney, Agent, or Firm*—Cushman, Darby & Cushman

[57] ABSTRACT

Nitrogen oxides and sulfur oxides are removed from exhaust gases in a two step process including a slurry removal of the sulfur oxides followed by washing the gases with an aqueous solution of an alkali metal iodide and/or an alkaline earth metal iodide.

7 Claims, 1 Drawing Figure

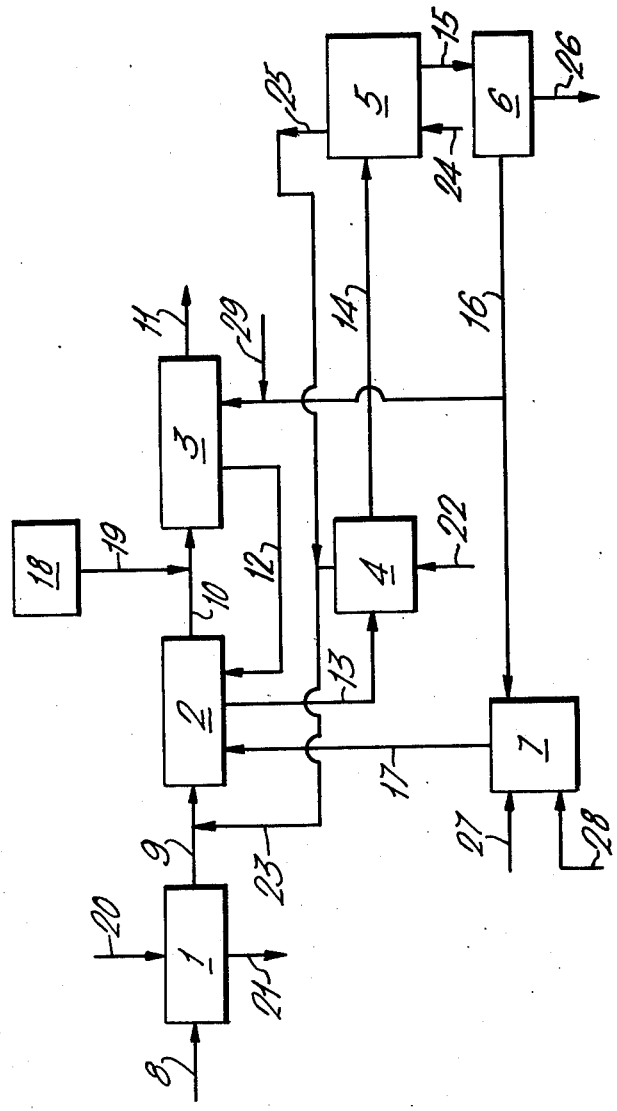

PROCESS FOR THE REMOVAL OF $SO_x$ AND $NO_x$ FROM WASTE GASES USING ALKALI METAL OR ALKALINE EARTH METAL IODIDE

The present invention relates to a process for wet-treating an exhaust gas to remove any oxide of sulfur ($SO_x$) and any oxide of nitrogen ($NO_x$) from the exhaust gas.

We, the present inventors have discovered that an aqueous solution containing an alkali metal iodide and/or alkaline earth metal iodide react with oxides of nitrogen ($NO_x$), particularly nitrogen dioxide ($NO_2$). Based on our discovery, we have invented a process for treating an exhaust gas containing oxides of sulfur and oxides of nitrogen which process comprises oxidizing an exhaust gas containing both an oxide of sulfur and an oxide of nitrogen, as occasion demands, and thereafter washing the exhaust gas with water which contains an alkali metal iodide and/or alkaline earth metal iodide. We have seperately filed patent application Serial No. 579,051 of May 20, 1975 for that invention.

According to the present invention there is provided a process for wet-treating an exhaust gas to remove any oxide of nitrogen and any oxide of sulfur from the exhaust gas, which process comprises the steps of:
1. washing the exhaust gas with a slurry containing one or more calcium compounds which react with the oxide of sulfur, thereby removing oxide of sulfur from the exhaust gas;
2. washing the exhaust gas from step (1) with an aqueous solution of alkali metal iodide and/or alkaline earth metal iodide to remove oxide of nitrogen from the exhaust gas; and 3. contacting the slurry from step (1) with the aqueous solution from step (2) to regenerate the solution of alkali metal iodide and/or alkaline earth metal iodide and to decompose any nitrite formed in step (2) to nitrogen.

As the reaction between oxides of nitrogen and the alkali metal iodide or alkaline earth metal iodide proceeds more readily when the oxide of nitrogen present is nitrogen dioxide, if the exhaust gas contains significant amounts of nitric oxide it is preferred to subject the exhaust gas to an oxidation reaction between step (1) and step (2) to convert nitric oxide to nitrogen dioxide.

In a preferred form of the process, the slurry from step (3) is subjected to an oxidation reaction to convert any calcium sulfite present to calcium sulfate, gypsum, which is separated from the liquid. The liquid separated from the slurry still contains alkali metal iodide and/or alkaline earth metal iodide as is circulated for re-use in step (2).

The first step of the process of the present invention is the step of washing the exhaust gas with a slurry containing one or more calcium compounds, for example a CaO or $CaCO_3$ slurry, to absorb and remove any oxide of sulfur from the exhaust gas. The reactions involved are shown as follows:

$$Ca(OH)_2 + SO_2 + H_2O \rightarrow CaSO_3 \cdot 1/2H_2O \tag{1}$$

$$Ca(OH)_2 + CO_2 \rightarrow CaCO_3 + H_2O \tag{2}$$

$$CaCO_3 + SO_2 + H_2O \rightarrow CaSO_3 \cdot 1/2H_2O + CO_2 \tag{3}$$

$$CaSO_3 \cdot 1/2H_2O + 1/2O_2 + H_2O \rightarrow CaSO_4 \cdot 2H_2O \tag{4}$$

Thus, in the first step, absorption of $SO_2$ by the slurry takes place in accordance with reaction (1). Production of $CaCO_3$ from $CO_2$ in the exhaust gas takes place in accordance with reaction (2). $CaCO_3$ (which may be present from reaction (2) or from limestone used in forming the slurry) further reacts with $SO_2$ in accordance with the reaction (3) to produce $CaSO_3 \cdot 1/2H_2O$ and $CO_2$. Some of the $CaSO_3 \cdot 1/2H_2O$ is oxidized to gypsum and oxygen in the exhaust gas in accordance with the reaction (4).

The exhaust gas, freed from $SO_2$ by this first step, is washed with an aqueous solution containing an alkali metal iodide and/or alkaline earth metal iodide to absorb and remove any oxide of nitrogen present in the exhaust gas. Because $NO_2$ is more readily absorbed by the aqueous solution than NO, as in cases where the greater portion of the oxides of nitrogen in the exhaust gas is $NO_2$, the exhaust gas from step (1) can be passed directly to step (2). However, in cases where a greater portion of the oxides of nitrogen in the exhaust gas is NO, the exhaust gas should be first treated with an oxidizing agent to oxidize NO in the exhaust gas to $NO_2$.

$$NO + [O] \rightarrow NO_2 \tag{5}$$

Examples of suitable oxidizing agents are ozone, hydrogen peroxide and nitric acid, of which ozone is preferred.

The exhaust gas, containing a greater portion of oxides of nitrogen as nitrogen dioxide $NO_2$, is then washed with an aqueous solution containing an alkali metal iodide and/or alkaline earth metal iodide. As will be apparent from the following reaction equation in which the iodide is potassium iodide, $NO_2$ in the exhaust gas is converted to a nitrite ($KNO_2$) and iodine is isolated in the solution. In general, iodine dissolved only slightly in water, but it does dissolve fairly well in an aqueous solution of potassium iodide, so that virtually no iodine is entrained with the released gas and lost.

$$2NO_2 + 2KI \rightarrow 2KNO_2 + I_2 \tag{6}$$

The exhaust gas thus treated in these first and second steps is freed from the major portion of the oxides of sulfur and nitrogen that were initially present and desorbed in the atmosphere.

In the third step, which is a recycling step, the treated slurry remaining from the first step is contacted and mixed with the treated absorbing liquid used in the second step to decompose the nitrite formed in the treated absorbing liquid of the second step to nitrogen in accordance with the reaction shown in the following reaction equation. At the same time, the third step has an object of regenerating iodine to an alkali metal iodide and/or alkaline earth metal iodide.

$$CaSO_3 \cdot 1/2H_2O + 2KNO_2 + I_2 \rightarrow CaSO_4 \cdot 2H_2O + 2KI + N_2 \uparrow \tag{7}$$

The reaction shown by the above reaction (7) to be carried out in this third step can be carried out in a conversion apparatus separate from the gas absorbing apparatus of the first and second steps. However, it is preferred to deliver the used absorbing liquid from the second step to the gas absorbing apparatus of the first step before the used absorbing liquid is supplied to this conversion apparatus, and thereafter to supply the used absorbing liquid of the first step together with the used slurry of the second step to this conversion apparatus. In the first step, the aforementioned reactions (1), (2), (3) and (4) take place and if the used absorbing liquid from the second step is delivered to the first step, the liquid from the second step does not interfere with these reactions. Moreover, because the used slurry of the first step contacts and reacts with the used absorbing light of the second step to thereby cause the reaction (7) to take place, a part of a nitrite existing in the used absorbing liquid of the second step is decomposed to nitrogen, it is thus possible to make the conversion apparatus smaller or even omit the conversion apparatus altogether in some instances. Further, a portion of the used slurry from the first step can be forwarded to the second step and contacted with the used absorbing liquid of the second step. Thereafter, the remaining portion of the used slurry from the first step can be supplied, together with the used slurry of the second step, to the conversion apparatus to complete the reaction (7). By so doing, iodine isolated in the second step becomes, for example, Kl by the reaction (7) as a result there is no increase in the concentration of iodine in the absorbing liquid of the second step and the diffusion of iodine in the exhaust gas is substantially completely suppressed.

The liquid obtained from the treatment of the third step is a slurry containing calcium sulfite, gypsum, some unreacted calcium slurry and an alkali metal iodide and/or alkaline earth metal iodide. When the amount of calcium sulfite used for decomposition of a nitrite in the reaction (7) is a part of the existing calcium sulfite in the system, a large amount of calcium sulfite still remains. This slurry is delivered to the subsequent fourth step for oxidation and in this step calcium sulfite is oxidized to gypsum. The conditions for this oxidation are generally on the acidic side, for example, the slurry has a pH less than 6, preferably 5 – 3, and the oxidation is carried out while air or oxygen is supplied into the reaction system. As a pH control agent in this step, generally sulfuric acid is used. The reaction (7) is also carried out more effectively in an acidic zone so that it is desirable to control the pH in the conversion apparatus of the third step. However, when pH control in the reaction (7) is carried out with sulfuric acid, a portion of the nitrite decomposes to NO. Therefore, for controlling the pH in the conversion apparatus, it is preferred to use concentrated $SO_2$ gas. This concentrated $SO_2$ gas is supplied from a cylinder or other source.

The pH-controlled slurry is oxidized by an oxidizing apparatus. For the oxidation, it is preferred to supply air or oxygen as fine bubbles under pressure, generally below about 5 atmospheres mixed with at a temperature of from about 50° to 85° C for at least about 1 hour for producing good quality gypsum.

As the slurry from the oxidizing apparatus contains gypsum and an alkali metal iodide and/or alkaline earth metal iodide, it is passed to a solid/liquid separator to collect gypsum as the solid phase and to obtain an aqueous solution containing an alkali metal iodide and/or alkaline earth metal iodide. The aqueous iodine solution is then re-used in the second step for the absorption of oxides of nitrogen.

The present invention will be further illustrated with reference to the accompanying drawing, which is a flow sheet of an embodiment according to the invention.

An exhaust gas, containing oxides of sulfur and oxides of nitrogen, leaves a combustion apparatus (not shown) and is first supplied via a line 8 to a humidifying and cooling apparatus 1, where the exhaust gas is humidified and cooled by water supplied from a line 20 and dust is removed via a line 21. The exhaust gas from the humidifying and cooling apparatus 1 is supplied via line 9 to an absorbing and washing apparatus 2 for removing oxides of sulfur in a first step referred to above. Into the absorbing and washing apparatus 2, a calcium slurry (a lime or limestone slurry) is supplied from a line 17, by which any oxides of sulfur in the exhaust gas are absorbed and removed. In the slurry, calcium sulfite is produced and reacts with a nitrite and iodine in a treated absorbing liquid from a second step, described below, supplied from a line 12 to regenerate an alkali metal and/or alkaline earth metal iodide and at the same time to decompose the nitrite to nitrogen.

The exhaust gas freed of oxides of sulfur in the absorbing and washing apparatus 2 is then forwarded to an absorbing and washing apparatus 3 where absorption of oxides of nitrogen takes place in the second step of the process of the invention as previously described. However, before ($NO_x$) absorption it is preferred to oxidize nitric oxide in the exhaust gas to nitrogen dioxide by ozone supplied from an ozone generating apparatus 18 via a line 19 before the exhaust gas enters this absorbing and washing apparatus 3. In the absorbing and washing apparatus 3 the exhaust gas is treated with a gypsum-freed filtrate forwarded via a line 16 and a line 29, described below, and the nitrogen dioxide in the exhaust gas is absorbed and removed by an alkali metal iodide and/or alkaline earth metal iodide contained in the gypsum-freed filtrate. The treated absorbing liquid from the absorption of oxides of nitrogen is recycled, as described above, to the absorbing and washing apparatus 2 of the first step via a line 12. The exhaust gas having been subjected to the first and second steps of the process is freed of dust, oxides of sulfur and oxides of nitrogen and released to the atmosphere from a line 11 after reheating if necessary.

The slurry from the absorbing and washing apparatus 2 of the first step is supplied via a line 13 to a conversion apparatus 4, where nitrite and iodine remaining in the slurry further react with calcium sulfite to complete decomposition of the nitrite to nitrogen and regeneration of the alkali metal iodide and/or alkaline earth metal iodide. As it is preferable to carry out the reaction in this conversion apparatus under acidic conditions and also preferable to oxidize the calcium sulfite to gypsum, as described below, in an acidic zone, for the purpose of making the pH of the slurry inside the conversion apparatus acidic, sulfuric acid or concentrated $SO_2$ gas is supplied as a pH control agent from a line 22. Because control of the pH in the conversion apparatus 4 may possible cause decomposition of the nitrite, generation of NO and generation of $SO_2$, it is preferred to forward these generated gases to the entrance of the absorbing and washing apparatus 2, particularly to line 9, via line 23.

The slurry whose pH is controlled in the conversion apparatus 4 is forwarded via a line 14 to an oxidizing apparatus 5, where the slurry is oxidized by fine bubbles of compressed air or oxygen supplied from a line 24 and calcium sulfite in the slurry is oxidized to gypsum. Because there is a possibility that some $SO_2$ may leave the oxidizing apparatus 5 with the compressed air or oxygen it is preferred not to release the air or oxygen directly into the atmosphere, but to return it to the line 9, also via the line 23.

A gypsum slurry extracted from the oxidizing apparatus 5 via a line 15 is separated in an apparatus for separating a solid from a liquid 6 into gypsum and a filtrate containing an alkali metal iodide and/or alkaline earth metal iodide. Gypsum is removed via a line 26. A major portion of the filtrate is circulated as an absorbing liquid for the absorbing and washing apparatus 3 of the second step via a line 16, and a minor portion of the filtrate is forwarded via the line 16 to a vessel (7) for preparing a calcium slurry for use in the first step. Into this preparing vessel 7, lime or limestone is supplied from a line 27, supply water is supplied from a line 28 and a gypsum-freed filtrate is forwarded from the line 16. From this mixture, a calcium slurry is prepared in this preparing vessel 7. The prepared calcium slurry is forwarded via a line 17 as mentioned above to the absorbing and washing apparatus 2. Theoretically, there is no loss of alkali metal and/or alkaline earth metal iodide in the process; however, in practice it adheres to gypsum and some filtrate containing iodide is lost. Therefore, an aqueous solution of an alkali metal and/or alkaline earth metal iodide in an amount corresponding to the amount lost is supplied via a line 29.

EXAMPLE 1

An exhaust gas at 130° C containing 170 ppm of NO, 1200 ppm of $SO_2$, 4.5% of $O_2$ and the balance of $N_2$ and $H_2O$ was passed via a humidifying and cooling apparatus 1 (spray-type, diameter 0.2 m, height 1.5 m) from a line 8 at 100 $Nm^3/h$, into an absorbing and washing apparatus 2 (grid-packed, diameter 0.2 m, height 2 m) for the first step and an absorbing and washing apparatus 3 (grid-packed, diameter 0.2 m, height 3.0 m) for the second step. As absorbent for the first step, slaked lime (5% by weight) was used and as an absorbent for the second step, a 20% aqueous solution of KI was used. The exhaust gas immediately before entering the absorbing and washing apparatus 3 for the second step was oxidized by ozone at 36 g/hr.

A gas exhausted from a line 11, 10 minutes after the operation was started had a gas temperature of about 57° C, an $SO_2$ concentration of 35 ppm and an $NO_x$ concentration of 20 ppm.

Although in the above example KI was used, similar results were obtained when other alkali metal and alkaline earth earth metal iodides were used.

What is claimed is:

1. A process for the aqueous absorption treatment of an exhaust gas containing oxides of sulfur and oxides of nitrogen which consist essentially of nitrogen dioxide to simultaneously remove both nitrogen dioxide ($NO_2$) and oxides of sulfur ($SO_x$) from the exhaust gas, the process comprising the separate, successive steps of:
    1. washing and contacting the exhaust gas with an inorganic calcium compound containing slurry, the calcium compound reacting with ($SO_x$) thereby removing the sulfur oxides from the exhaust gas; and thereafter, in a separate step,
    2. washing and contacting the exhaust gas treated according to step (1) with an aqueous solution of an alkali metal iodide, alkaline earth metal iodide or mixture of alkali metal iodide and alkaline earth metal iodide to remove $NO_2$ from the exhaust gas; and thereafter
    3. contacting the slurry remaining from step (1) with the aqueous solution remaining from step (2) to regenerate the alkali metal iodide or alkaline earth iodide solution and to decompose nitrite formed in step (2) to nitrogen.

2. A process according to claim 1 including an additional step wherein the exhaust gas from step (1) is treated with an oxidizing agent to convert any nitric oxide to nitrogen dioxide before washing step (2).

3. A process according to claim 2 wherein the oxidizing agent is ozone, hydrogen peroxide or nitric acid.

4. A process according to claim 1 wherein aqueous solution remaining from step (2) is supplied to step (1).

5. A process according to claim 1 wherein aqueous solution remaining from step (1) is supplied to step (2).

6. A process according to claim 1 including the additional step of oxidizing the slurry from step (3) in which calcium sulfite contained therein is oxidized to calcium sulfate.

7. A process according to claim 6 wherein the slurry remaining after the oxidation reaction is separated into a solid composed of calcium sulfate and a filtrate containing the alkali metal iodide or alkaline earth metal iodide which filtrate is then recycled in step (2).

* * * * *